US009444526B2

(12) United States Patent
Hoymann et al.

(10) Patent No.: US 9,444,526 B2
(45) Date of Patent: Sep. 13, 2016

(54) TECHNIQUES FOR QUANTIZATION ADAPTATION IN COOPERATIVE SIGNAL COMMUNICATION

(75) Inventors: Christian Hoymann, Aachen (DE); Michael Meyer, Aachen (DE); Laetitia Falconetti, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1076 days.

(21) Appl. No.: 13/266,419

(22) PCT Filed: Apr. 28, 2009

(86) PCT No.: PCT/EP2009/055155
§ 371 (c)(1),
(2), (4) Date: Jan. 4, 2012

(87) PCT Pub. No.: WO2010/124726
PCT Pub. Date: Nov. 4, 2010

(65) Prior Publication Data
US 2012/0134429 A1    May 31, 2012

(51) Int. Cl.
| | | |
|---|---|---|
| H04W 4/00 | (2009.01) | |
| H04B 7/02 | (2006.01) | |
| H04W 80/04 | (2009.01) | |
| H04W 36/14 | (2009.01) | |
| H04W 36/08 | (2009.01) | |
| H04W 36/00 | (2009.01) | |
| H04W 36/18 | (2009.01) | |

(52) U.S. Cl.
CPC ............. *H04B 7/024* (2013.01); *H04W 80/04* (2013.01); *H04W 36/0011* (2013.01); *H04W 36/08* (2013.01); *H04W 36/14* (2013.01); *H04W 36/18* (2013.01)

(58) Field of Classification Search
CPC .............. H04W 80/04; H04W 36/18; H04W 36/0011; H04W 36/14; H04W 36/08
See application file for complete search history.

(56) References Cited

U.S. PATENT DOCUMENTS

| | | |
|---|---|---|
| 2001/0020285 A1 | 9/2001 | Fujiwara et al. |
| 2006/0194546 A1* | 8/2006 | Gunnarsson et al. .......... 455/69 |
| 2007/0258531 A1* | 11/2007 | Chen et al. ................... 375/261 |
| 2008/0170512 A1 | 7/2008 | Hwang et al. |
| 2008/0198816 A1* | 8/2008 | Kats et al. .................... 370/337 |

(Continued)

FOREIGN PATENT DOCUMENTS

JP    2001237753 A    8/2001

OTHER PUBLICATIONS

ZTE, "Uplink CoMP joint processing schemes", TSG-RAN WG1 #55bis, Jan. 12-16, 2009, Ljubljana, Slovenia, R1-090414.

(Continued)

*Primary Examiner* — Lonnie Sweet
(74) *Attorney, Agent, or Firm* — Coats & Bennett, P.L.L.C.

(57) ABSTRACT

In cooperative signal communication between a mobile terminal (200) and a plurality of access nodes (100-1, 100-2, 100-3), cooperation signals (20), e.g. received signals or signals to be transmitted, are communicated with the access nodes (100-1, 100-2, 100-3). The cooperation signals (20) are quantized according to a quantization parameter, e.g. quantization depth and/or quantization type, which is adapted on the basis of a cooperative communication parameter. The cooperative communication parameter is a characteristic of the cooperative communication process, e.g. modulation scheme.

17 Claims, 11 Drawing Sheets

(56) References Cited

U.S. PATENT DOCUMENTS

2009/0060010 A1* 3/2009 Maheshwari ......... H04L 1/0029
375/211
2010/0110967 A1* 5/2010 Sartori et al. ................. 370/315

OTHER PUBLICATIONS

Vodafone Group, "Coordinated Multi Point transmission/reception Requirements", 3GPP TSG RAN WG1 Meeting #54bis, Sep. 29-Oct. 3, 2008, Prague, Czech Republic, R1-083853.
Alcatel-Lucent Shanghai Bell et al., "Efficient uplink coordinated multi-point reception with reduced backhauling cost", 3GPP TSG RAN WG1 Meeting #56bis, Mar. 23-27, 2009, Seoul, Korea, R1-091478.
Alcatel Shanghai Bell, et al., "Multi-cell MIMO with distributed inter-cell interference suppression for LTE-A Uplink", 3GPP TSG RAN WG1 Meeting #53bis, Jun. 30-Jul. 4, 2008, Warsaw, Poland, R1-082499.
3rd Generation Partnership Project. "DL MIMO for LTE-Advanced." 3GPP TSG-RAN WG1 #56bis, R1-091574, Seoul, Korea, Mar. 23-27, 2009.
3rd Generation Partnership Project. "LTE-Performance and IMT-Advanced Requirements." 3GPP TSG RAN WG1 Meeting #56bis, R1-091319, Seoul, Korea, Mar. 23-27, 2009.
Kim, J. H. et al. "Efficient Feedback via Subspace-Based Channel Quantization for Distributed Cooperative Antenna Systems with Temporally Correlated Channels." EURASIP Journal on Advances in Signal Processing, vol. 2008, Article ID 847296, Dec. 1, 2007.
Krishna, R. et al. "A Semidefinite Programming Based Cooperative Relaying Strategy for Wireless Mesh Networks with Relay Signal Quantization." IEEE 69th Vehicular Technology Conference, Barcelona, Spain, Apr. 26-29, 2009.

* cited by examiner

TECHNIQUES FOR QUANTIZATION ADAPTATION IN COOPERATIVE SIGNAL COMMUNICATION

TECHNICAL FIELD

The present invention relates to techniques for quantization adaptation in cooperative signal transmission.

BACKGROUND

Cellular systems in general suffer from co-channel interference. For example, simultaneous transmissions may use the same physical resources and thus generate mutual interference. This co-channel interference reduces the signal quality, which may be measured as signal to interference plus noise ratio (SINR). The reduced signal quality in turn reduces the system capacity.

Future wireless networks, e.g. $3^{rd}$ Generation Partnership Project Long Term Evolution (3GPP LTE) and 3GPP LTE Advanced, with a more dense deployment of access nodes, e.g. base stations (BSs), or with a higher density of users will most probably remain interference-limited.

There exist proposals to use an approach of cooperative signal communication, e.g. in 3GPP LTE Advanced which refers thereto as cooperative multipoint transmission and reception (COMP). In this approach, receive (Rx) signals are collected from a plurality of BSs for implementing uplink (UL) cooperation, and transmit (Tx) signals are transmitted from a plurality of BSs for implementing downlink (DL) cooperation.

In UL cooperation, several receiving access nodes, e.g., base stations (BSs) or remote radio heads (RRHs), receive a signal from a mobile terminal, also referred to as user equipment (UE), thereby obtaining multiple Rx signals from the terminal. The Rx signals are then communicated between access nodes and jointly processed, e.g. at a central node or at a serving BS.

In DL cooperation, a central node or a serving BS distributes a Tx signal to several transmitting access nodes, e.g. BSs or RRHs. The transmitting access nodes jointly transmit the signal to the terminal.

In both cooperation scenarios, signals may be processed, i.e. by joint reception in UL or joint pre-coding in DL, at a central node or at a serving access node so that co-channel interference is mitigated. Furthermore, the cooperative signal reception or transmission may increase the carrier signal strength.

In the approach of cooperative signal communication, cooperating communication nodes, i.e. receiving access nodes and/or transmitting access nodes, need to quantize analogue information in order to communicate it in a digital way to other access nodes. Parameters of the quantization process, e.g. the quantization depth which may be defined as the amount of bits per analogue value, determine the amount of communicated information and the required transport capacity. For example, the higher the quantization depth, the larger is the amount of communicated information. The smaller the quantization depth, the smaller is the required transport capacity.

A typical design criterion when implementing a quantization process is the distance between the expected/perceived value and the quantized value. For example, quantizers for signal detection can be configured to perform optimally under a given Signal-to-Noise ratio (SNR). If the SNR varies over time, one known approach is to design a fixed quantizer for an approximated SNR. The fixed quantizer is then used irrespective of the actual SNR.

When using cooperative signal communication, e.g. in COMP-enabled systems, the exchange of Rx or Tx signals, especially In-Phase/Quadrature (IQ) samples, causes a lot of traffic between BSs or other nodes. The resulting data traffic capacity requirement depends, among others, on the number of cooperating access nodes. Accordingly, situations may occur in which it is not possible to use cooperative signal communication with a desired number of cooperating access nodes due to insufficient data traffic capacity between the access nodes. On the other hand, providing a communication network with increased data traffic capacity for communication between access nodes or other nodes may require significant resources.

Accordingly, there is a need for techniques that overcome the aforementioned problems and allow for efficiently implementing a communication network enabled for cooperative signal communication.

SUMMARY

It is an object of the present invention to meet the above need. This is achieved by methods and devices according to the independent claims. The dependent claims define further embodiments of the invention.

According to an aspect of the invention, a method of cooperative signal communication is provided. According to the method a cooperative communication parameter for cooperative communication of a signal is determined. The cooperative communication of the signal takes places at least on a first communication path between a first access node and a mobile terminal, and a second communication path between a second access node and the mobile terminal. Further, a digital quantization parameter of a cooperation signal communicated with the first access node and/or the second access node is set on the basis of said cooperative communication parameter. The cooperation signal carries information for said cooperative communication of the signal.

According to a further aspect of the invention, computer program to be executed by a processor is provided. The computer program comprises code adapted to execute the steps of the above method.

According to a further aspect of the invention, a device is provided. The device comprises a processor. The processor is configured to determine a cooperative communication parameter for cooperative communication of a signal. The cooperative communicating of the signal takes places at least on a first communication path between a first access node and a mobile terminal, and a second communication path between a second access node and the mobile terminal. The processor is further configured to set, on the basis of said cooperative communication parameter, a digital quantization parameter of a cooperation signal. The cooperation signal is communicated with the first access node and/or the second access node. The cooperation signal carries information for said cooperative communicating of the signal.

DETAILED DESCRIPTION OF EMBODIMENTS

Figure 1:
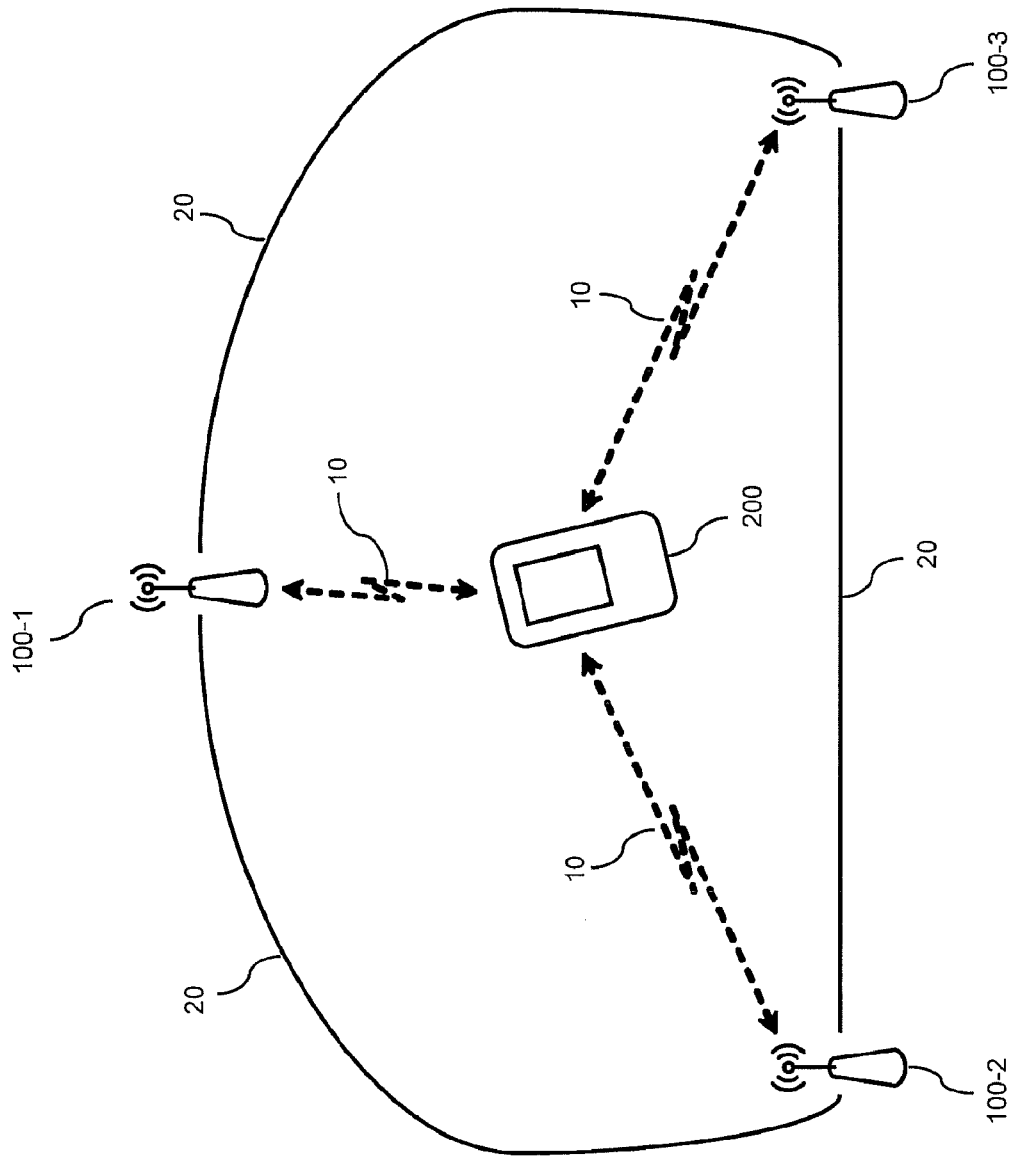
FIG. 1 schematically illustrates a communication network environment in which concepts according to embodiments of the present invention can be applied.

In the following, the invention will be explained in more detail by referring to exemplary embodiments which relate to methods, devices and computer programs for cooperative signal transmission.

The concepts according to the embodiments as described herein take advantage from the fact that in cooperative signal communication in a communication network the amount of data to be communicated between cooperating access nodes typically depends on quantization parameters of the communicated digital signal. Such a quantization parameter may be a quantization depth, i.e. on how many bits are used to represent information such as an IQ sample or a soft bit. According to an embodiment it is proposed to adapt a quantization parameter, e.g. the quantization depth or a quantization type, depending on a cooperative communication parameter. The cooperative communication parameter characterizes the cooperative communication of a signal and may be, e.g. a transmission-specific parameter, such as a type of modulation scheme or a type of coding, or may be a cooperation-specific parameter, such as a path gain difference between different communication paths used in the cooperative signal communication.

Accordingly, several criteria may be considered to adapt the quantization parameter, Some of the criteria may be known at a central node of the communication network or at a serving access node, some criteria may be known at a receiving or transmitting access node, e.g. a supporting access node or RRH.

An access node can be embodied in a BS or a section of a BS. Further, an access node may also be an e-Node-B (eNB). A section of a BS may be regarded as a unit to cover a cell area of a cellular radio frequency (RF) communication network. Such a unit typically comprises one or more antennas, RF-parts such as filters and power-amplifiers or low-noise amplifiers, and signal processing means. Cooperative signal communication may be achieved via at least two access nodes, e.g. a first BS and a second BS and/or a first section of a first BS and a second section of the same BS or of a second BS. BS-to-BS-cooperation may be also denoted as inter-base-station cooperation or inter-eNB cooperation, and section-to-section-cooperation of the same base station also as intra-base-station cooperation or intra-eNB cooperation.

In the description of the following embodiments, the terms "access node" and "base station" are used in a synonymous manner. This has been done for legibility and illustrative reasons and is not meant to exclude section-to-section cooperation, be it with the same or between different base stations, from being applicable to the following embodiments.

According to some embodiments, a centralized control scheme may be applied. With a centralized control scheme, a central node may collect UL signals from receiving access nodes and/or distributes DL signals to transmitting access nodes.

According to some embodiments, a distributed control scheme may be applied. With a distributed control scheme, an access node, e.g. a serving BS or a section of a serving BS, is responsible for signal communication transmissions in its own cell. If needed, the communication node may request cooperation from one or more further access nodes, e.g. supporting BSs and/or further sections of the serving BS and/or of further BSs.

According to some embodiments, it is also possible to combine features of a centralized control scheme and features of a distributed control scheme. For example, some processes may be carried out under centralized control, whereas other processes may be carried out under distributed control.

According to some embodiments, UL cooperation of access nodes is implemented. In UL cooperation, an access node, e.g. a BS or a section of a BS, receives a UL signal from a terminal and may also pre-process the UL signal. The received UL signal is communicated to a central node and/or to another access node, e.g. a serving BS of the terminal or another section of the same BS, for joint detection and/or joint decoding. In this process, the UL signal may be communicated as samples in the time domain, as IQ samples in the frequency domain, or as soft bit values of coded or uncoded bits.

According to some embodiments, DL cooperation of access nodes is implemented. In DL cooperation, a central node or an access node, e.g. a serving BS or a section of a BS, pre-processes data intended for a terminal, thereby generating a DL signal to be transmitted to the terminal. The DL signal is communicated to one or more further access nodes, e.g. supporting access nodes or other sections of the same BS, to be cooperatively transmitted to the terminal. In this process, the DL signal may be communicated as samples in the time domain, or as IQ samples in the frequency domain.

According to some embodiments, UL cooperation and DL cooperation may be combined.

In the following, embodiments of the present invention will be explained in more detail by referring to the accompanying drawings.

FIG. 1 shows a mobile communication network environment, in which concepts according to embodiments of the present invention may be applied. For example, the mobile communication network environment may be an LTE network. The mobile communication network environment comprises a plurality of access nodes 100-1, 100-2, 100-3 and a mobile terminal 200. In the following, it will be assumed that the access nodes 100-1, 100-2, 100-3 are BSs of the communication network. However, it is to be understood that the concepts described herein could also be applied to other types of access nodes, e.g. to different sections of the same BS. The terminal 200 may be a mobile phone, a portable computer or other type of UE. In the following the terminal will thus also be referred to as UE.

The BSs 100-1, 100-2, 100-3 may cooperatively communicate with the terminal 200 by transmitting, i.e. sending or receiving, a signal 10 on different communication paths, i.e. a first communication path between the BS 100-1 and the terminal 200, a second communication path between the BS 100-2 and the terminal 200, and a third communication path between the BS 100-3 and the terminal 200. One of the BSs, e.g. the BS 100-1, may be a serving BS, and the other BSs, e.g. the BSs 100-2, 100-3, may be supporting BSs.

Cooperative reception of the signal 10 by at least two of the BSs 100-1, 100-2, 100-3 may also be referred to as UL cooperation, whereas cooperative transmission of the signal 10 from at least two of the BSs 100-1, 100-2, 100-3 may also be referred to as DL cooperation.

For cooperative reception of the signal 10, the BSs 100-1, 100-2, 100-3 exchange information concerning individual Rx signals from the terminal 200, e.g. the supporting BS 100-2 may communicate information relating to the Rx signal from the terminal 200 to the serving BS 100-1, and the supporting BS 100-3 may communicate information relating to the Rx signal from the terminal 200 to the serving BS 100-1. For this purpose, the BSs 100-1, 100-2, 100-3 exchange cooperation signals 20, e.g. on a transport link, sometimes also referred to as backhaul.

For cooperative transmission of the signal 10, the BSs 100-1, 100-2, 100-3 exchange information concerning Tx signals intended for the terminal 200, e.g. the serving BS 100-1 may communicate information relating to the Tx signal for the terminal 200 to the supporting BS 100-2 and to the supporting BS 100-3. Again, this is accomplished by the BSs 100-1, 100-2, 100-3 exchanging cooperation signals 20. The serving base station 100-1 and the supporting base stations 100-2, 100-3 may then jointly transmit the Tx signal to the terminal 200.

Different types of cooperation signals 20 can be exchanged. In the case of UL cooperation, an Rx signal received by the supporting BS 100-2, 100-3 may be communicated to the serving BS 100-1, e.g. in the form of soft complex baseband signals, e.g. compressed and/or quantized IQ samples, or residual soft complex baseband signals where already detected streams are cancelled out. The Rx signals may also be communicated in the form of compressed and/or quantized soft bits. Soft values of coded bits may be generated by a demodulator of the supporting BS 100-2, 100-3. Soft values of uncoded bits may be generated in a convolutional decoder of a turbo decoder in the supporting BS 100-2, 100-3. In the case of DL cooperation, a Tx signal to be transmitted to the terminal 200 can be communicated from the serving BS 100-1 to the supporting BSs 100-2, 100-3, e.g. in the form of soft complex baseband signals, e.g. compressed and/or quantized IQ samples or time-domain samples.

It is to be understood that an arbitrary number of BSs could participate in the cooperative signal communication. For example, there could be only one supporting BS or there could be two, three, four or more supporting BSs. Further, the BSs 100-1, 100-2, 100-3, and the terminal may operate in a cooperative mode, in which the signal 10 is cooperatively communicated on the communication path between the terminal 200 and the serving BS 100-1 and on at least one further communication path between the terminal 200 and respective supporting BSs 100-2, 100-3, or in non-cooperative mode, in which the signal 10 is communicated between the terminal 200 and only the serving BS 100-1. In UL cooperation, the cooperative mode may also be referred to as cooperative point-to-multipoint (co-PTM) mode. In DL cooperation, the cooperative mode may also be referred to as cooperative multipoint-to-point (co-MTP) mode.

Figure 2:
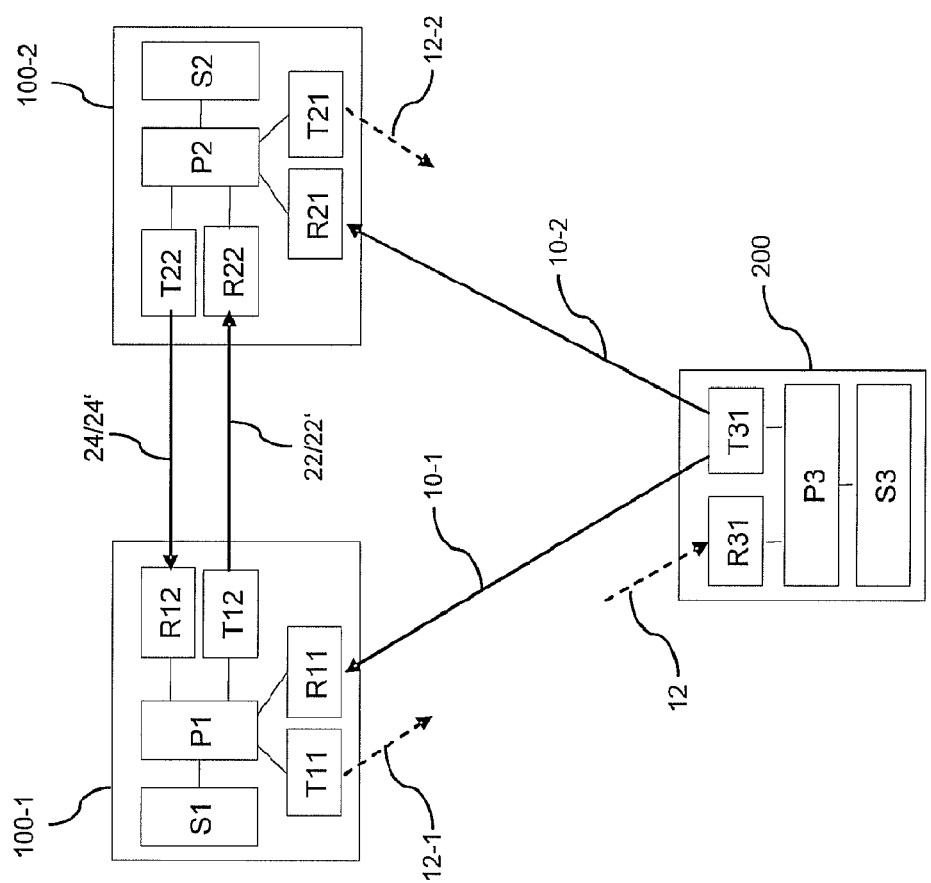
FIG. 2 schematically illustrates an implementation of devices in a communication network according to an embodiment of the invention.

FIG. 2 schematically illustrates an exemplary implementation of devices according to an embodiment of the invention which relates to cooperation of access nodes with distributed control. The access nodes may be BSs or other types of access nodes, e.g. different sections of the same BS. Further, FIG. 2 also illustrates communication between these devices. In FIG. 2, elements which are similar to those of FIG. 1 have been designated with the same reference signs. Additional information concerning these elements can thus be obtained from the above explanations in connection with FIG. 1.

In FIG. 2, a serving access node (BS1) 100-1, e.g. a serving BS, a supporting access node (BS2) 100-2, e.g. a supporting BS, and a terminal or UE 200 are depicted. In the following, the serving access node 100-1 may also be referred to as first access node or first BS, and the supporting access node 100-2 may also be referred to as second access node or second BS. The supporting access node 100-2 may have been selected for a cooperation with the serving access node 100-1 so as to improve or optimize the signal reception or transmission with respect to the terminal 200, e.g. according to one or more selection criteria.

For illustrative reasons, further one or more possible supporting access nodes, which may be selected or not, or further one or more access nodes that do not qualify at all for support, e.g. because there exists no link between the serving access node and these one or more further access nodes, are not depicted. Further possible terminals which could be associated to the access nodes 100-1, 100-2 or to any further access node are not depicted as well.

Further, it should be noted that an access node, e.g. one of the access nodes 100-1, 100-2, can be a serving access node for a particular terminal while it is a supporting access node for another terminal. If the terminal moves and a further access node takes over the role of the serving access node, the previous serving access node may take over the role of a supporting access node or may not be considered anymore for cooperation.

The individual devices 100-1, 100-2, 200 each comprise one or more sub-units with a sub-unit starting with T denoting a transmission unit or transmitter, a sub-unit starting with R denoting a receiving unit or receiver, a sub-unit starting with P denoting a processing unit or processor, and a sub-unit starting with S denoting a storage unit or memory.

The terminal 200 comprises a transmission unit T31 for sending a signal 10-1 to the serving access node 100-1 and a signal 10-2 to the supporting access node 100-2. In practice, the signals 10-1 and 10-2 are typically transmitted by the terminal 200, i.e. the transmission unit T31, as one Tx signal only. Further, the terminal comprises a receiving unit R31 for receiving an Rx signal 12, e.g. from the serving access node 100-1 or from the supporting access node 100-2 as illustrated by the dashed arrows. Due to a, typically non-directive, antenna of the terminal 200 and the channel characteristics the Tx signal is received by the serving access node 100-1 as the Rx signal 10-1 and by the supporting access node 100-2 as the Rx signal 10-2. Due to similar considerations, the Rx signal 12 may be a superposition of a Tx signal 12-1 from the serving BS 100-1 and a Tx signal 12-2 from the supporting access node 100-2. In addition, the terminal 200 comprises a processing unit P3 for processing information and messages, and a storage unit S3 for storing and retrieving information.

The serving access node 100-1 comprises a receiving unit R11, and the supporting access node 100-2 comprises a receiving unit R21, for receiving the signal 10-1 and 10-2, respectively, from the terminal 200. Here it is to be understood that the receiving units R11, R21 may also be used for receiving signals from further terminals not shown here. Further, the serving access node 100-1 comprises a transmission unit T11, to transmit the Tx signal 12-1 to the terminal 200, and the supporting access node 100-2 comprises a transmission unit T21, to transmit the Tx signal 12-2 to the terminal 200. It is to be understood that the transmission units T11, T21 may also be used for transmitting signals to further terminals not shown here. As further illustrated, the serving access node 100-1 comprises a processor P1, and a storage unit S1. Similarly, the supporting access node 100-2 comprises a processing unit P2 and a storage unit S2. The access nodes 100-1, 100-2 may thus be provided with a processing capability for processing the exchanged and received information and/or with storage capability for storing data.

In addition, the serving access node 100-1 comprises a transmission unit T12 for transmitting signals to other access nodes, e.g. to the supporting access node 100-2, and a receiving unit R12 for receiving signals from other access nodes, e.g. from the supporting access node 100-2. Similarly, the supporting access node 100-2 comprises a transmission unit T22 for transmitting signals to other access nodes, e.g. to the serving access node 100-1, and a receiving unit R22 for receiving signals from other access nodes, e.g. from the serving access node 100-1. The transmission unit T12 and the receiving unit R12 thus provide an interface of the serving access node 100-1 with respect to other access nodes, e.g. the supporting access node 100-2, and the transmission unit T22 and the receiving unit R22 thus provide an interface of the supporting access node 100-2 with respect to other access nodes, e.g. the serving access node 100-1.

The transmission unit T12 and the receiving unit R22 may be connected directly, e.g. by a wired connection such as via a cable or via the backplane of a server rack, or indirectly, e.g. through any wireless or wired transport network with intermediate switching and/or routing nodes. Similarly, the transmission unit T22 and the receiving unit R12 may be connected directly, e.g. with a cable, or indirectly, e.g. through any wireless or wired transport network with intermediate switching and/or routing nodes.

Accordingly, the serving access node 100-1 and the supporting access node 100-2 may communicate via dedicated physical connection, e.g. cable or fiber, directly connecting the serving access node 100-1 and the supporting access node 100-2. According to another example, the serving access node 100-1 and the supporting access node 100-2 may communicate via a switched or routed communication network with intermediate switching or routing nodes. An example for an interconnection of access nodes suitable for implementing the concepts as described herein is the interface X2 according to the 3GPP LTE specification, which is an IP-based interface being independent of the underlying transport network.

The receiving units R11 and R12 may use different communication technologies, e.g. for communicating with the terminal 200, via the transmission unit T31, a wireless communication technique such as LTE may be used, and for communicating with the supporting access node 100-2, via the transmission unit T22, a wired communication technique may be used, such as Ethernet. The same applies to the transmission units T11 and T12 as well as to the corresponding units R21 and R22 or T21 and T22 of the supporting access node 100-2. However, implementations are conceivable wherein receiving units R11 and R12 may be of the same communication technology, e.g. both wireless, or even be combined into one receiving unit. The same may apply to the transmission units T11 and T12 as well as to the corresponding sub-units of the supporting access node 100-2, i.e. the receiving units R21 and R22 or the transmission units T21 and T22. A receiving unit and a corresponding transmission unit in the same device, such as the receiving unit R11 and the transmission unit T11, the receiving unit R12 and the transmission unit T12, the receiving unit R21 and the transmission unit T21, the receiving unit R22 and the transmission unit T22, or the receiving unit R31 and the transmission unit T31, may be combined in a transceiving unit or transceiver.

In UL cooperation, the serving access node 100-1 can request information relating to the Rx signal 10-2 from the supporting access node 100-2 using its transmission unit T12, e.g. by sending a UL cooperation request message 22 or a UL cooperation subscribe message 22' to the supporting access node 100-2. The supporting access node 100-2 receives the signal 10-2 via its receiving unit R21. The information may be the Rx signal 10-2 in a format as defined in the request, e.g. IQ samples in the frequency domain, samples in the time domain, soft bits, or hard bits, coded or uncoded. The processing unit P2 is adapted to obtain the requested information from the Rx signal 10-2. The supporting access node 100-2 can send the requested information via its transmission unit T22 to the receiving unit R12 of the serving access node 100-1, e.g. in a response message 24 or in a publish message 24'. Further details concerning the response message 24 and the publish message 24' will be explained below. The processing unit P1 of the serving access node is adapted to determine an improved or optimized Rx signal from the terminal, which is accomplished on the basis on the requested information as received from the supporting access node 100-2 and on corresponding information relating to the signal 10-1, which is received by the serving access node 100-1 itself.

In DL cooperation, the serving access node 100-1 may send information relating to the signal 12-2 to be transmitted from the supporting access node 100-2 using its transmission unit T12, e.g. in a DL cooperation request message 22. The information may be the Tx signal 12-2 in a specific format, e.g. IQ samples in the frequency domain, or samples in the time domain. On the basis of the information received from the serving access node 100-1, the supporting access node 100-2 sends the signal 12-2 to the terminal 200.

The DL cooperation request message 22 may thus comprise cooperation signals communicated from the serving access node 100-1 to the supporting access node 100-2. Further details concerning the DL cooperation request message 22 are explained below. Similarly, the response message 24 or the publish message 24' may comprise cooperation signals communicated from the supporting access node 100-2 to the serving access node.

Figure 3:
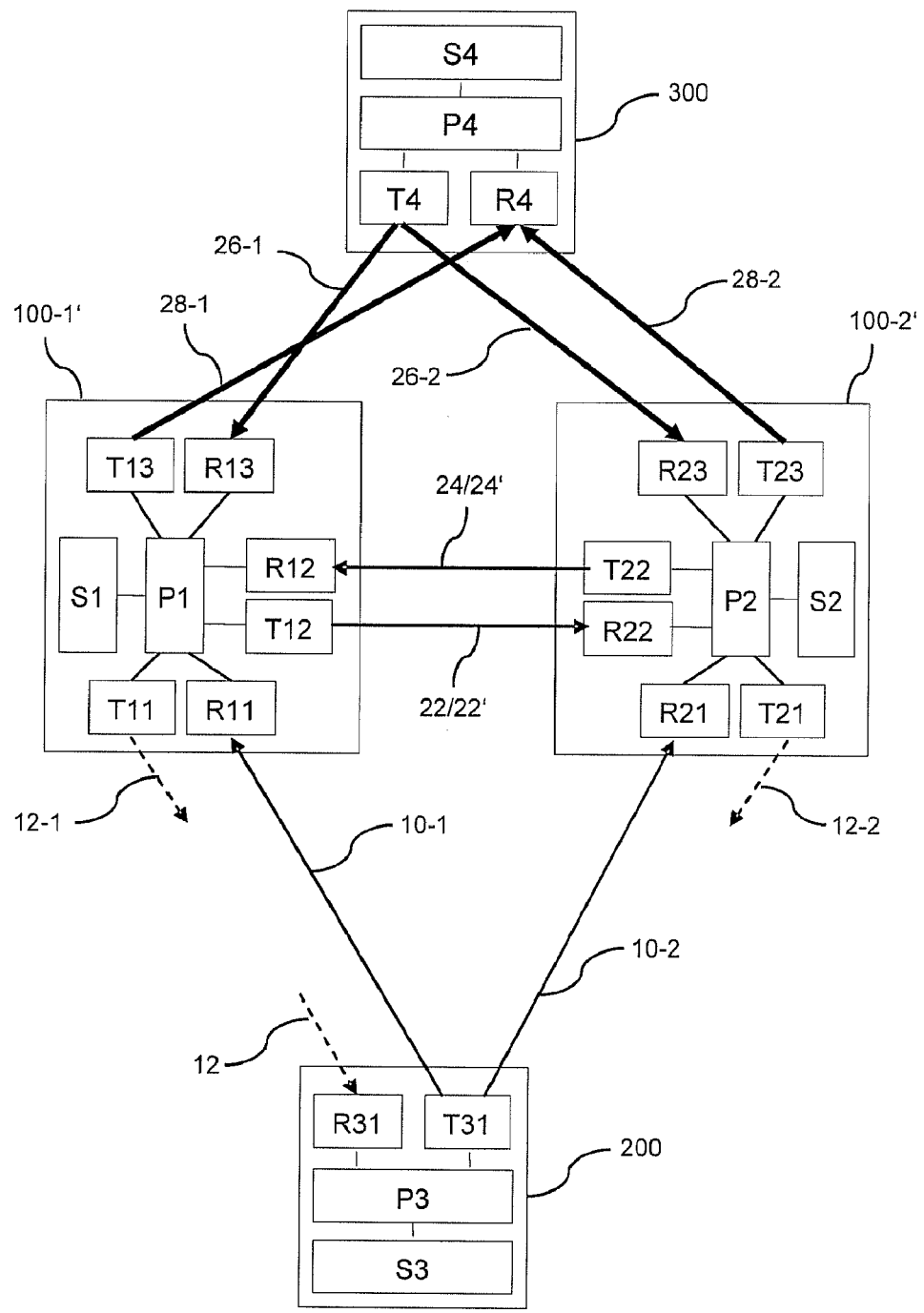
FIG. 3 schematically illustrates a further implementation of devices in a communication network according to an embodiment of the invention.

FIG. 3 schematically illustrates a further exemplary implementation of devices according to an embodiment of the invention. In addition, FIG. 3 also illustrates communication between these devices. In FIG. 3, elements which are similar to those of FIGS. 1 and 2 have been designated with the same reference signs. Additional information concerning these elements can thus be obtained from the above explanations in connection with FIGS. 1 and 2. As compared to FIG. 2, which relates to an embodiment with distributed control of the cooperative signal communication, FIG. 3 illustrates a situation in which at least a part of the cooperative signal communication is subject to a centralized control scheme.

In FIG. 3, a central node 300 is provided, which implements control functionalities with respect to cooperation of a serving access node 100-1' and a supporting access node 100-2'. The central node 300 comprises a storage unit S4, a processor P4, a receiving unit R4, and a transmission unit T4. The transmission unit may transmits a cooperation signal 26-1 to the access node 100-1', and a cooperation signal 26-2 to the access node 100-2'.

In the embodiment of FIG. 3, the access node 100-1' may be similar to the serving access node 100-1, and the access node 100-2' may be similar to the supporting access node 100-2. However, the access node 100-1' additionally comprises a receiving unit R13 for receiving the cooperation signal 26-1 from the central node 300 and a transmitting unit T13 for transmitting the cooperation signal 28-1 to the central node 300. Similarly, the access node 100-2' additionally comprises a receiving unit R23 for receiving the cooperation signal 26-2 from the central node 300 and a transmitting unit T23 for transmitting the cooperation signal 28-2 to the central node 300. The transmission unit T13 and the receiving unit R13 thus provide an interface of the serving access node 100-1' with respect to the central node 300, and the transmission unit T23 and the receiving unit R23 thus provide an interface of the access node 100-2' with respect to the central node 300. In some embodiments, e.g. with centralized control only, the transmitting unit T12 and the receiving unit R12 of the access node 100-1' and the transmitting unit T22 and the receiving unit R22 of the access node 100-2' may be omitted. In some embodiments, the interface with respect to the central node 300 and the interface with respect to other access nodes could be implemented as a single interface of the access node 100-1' or of the access node 100-2'. According to some embodiments, the access node 100-1' and the access node 100-2' may thus communicate cooperation signals 26-1, 26-2, 28-1, 28-2 with the central node 300, whereas in other embodiments cooperation signals 22/22', 24/24' may be communicated directly between the access node 100-1' and the access node 100-2'. In some embodiments, as illustrated in FIG. 3, both scenarios may be combined with each other. For example, cooperation signals associated with a high data load could be communicated directly between the access node 100-1' and the access node 100-2', whereas cooperation signals associated with a low data load could be communicated with or via the central node 300. In this connection, it is to be understood, that the central node 300 may receive the cooperation signal 28-2 in the form of the Rx signal 10-2 from the access node 100-2', process the Rx signal, and transmit the processed RX signal 10-2 to the access node 100-1' as the cooperation signal 26-1. Alternatively, the central node 300 could also forward the Rx signal 10-2 without any processing. Any required processing steps could then be performed in the access node 100-2' and/or in the access node 100-1'. Further, the central node 300 may receive the cooperation signal 28-1 from the access node 100-1' in the form of the Tx signal to be transmitted to the terminal 200, process the Tx signal, and transmit the processed Tx signal to the access node 100-2'. Alternatively, the central node 300 could also forward the Tx signal without any processing. Any required processing steps could then be performed in the access node 100-1' and/or in the access node 100-2'.

In the above scenarios as explained in connection with FIGS. 1-3, cooperation signals are communicated in various ways. For example, cooperation signals may be communicated from one access node 100-1, 100-1', 100-2, 100-2' to the other or from one access node 100-1, 100-1', 100-2, 100-2' to the central node 300. Further, cooperation signals may be received at an access node 100-1, 100-1', 100-2, 100-2' or be received at the central node 300. The cooperation signals are communicated as digital signals and thus subjected to a quantization process, typically at an originating node of the cooperation signal. In the following, embodiments of the invention will be described in more detail. According to these embodiments, one or more quantization parameters are adapted. These embodiments may be based on the devices and structures of a communication network as illustrated in any one of FIGS. 1-3.

The description of FIGS. 2 and 3 above has been written from the perspective of inter-base-station cooperation. For section-to-section cooperation, reference sign 100-1 or 100-1' may denote a first section and reference sign 100-2 or 100-2' a second section. If the access nodes 100-1 and 100-2 or the access nodes 100-1' and 100-2' are sections of a single base station, interfaces R12, T12, R22, T22 may be internal interfaces of the base station, e.g. for communication between two processing boards in the same base station rack. In this case, connection of transmission and receiving units R12, T12 with transmission and receiving units T22, R22 (as depicted) may be via the backplane of the base station server rack or via a computer bus if the two sections are located at the same physical location. Furthermore, central node 300 may be separate from the two sections 100-1', 100-2' or may be located at the same physical location as section 100-1' and/or 100-2'. In the case of co-location, interfaces R4, T4 become internal interfaces to T13, R13 and/or T23,R23, e.g. via the backplane of a base station server rack or via a computer bus.

The amount of exchanged data, and of exchanged information, between cooperating access nodes or communicated with other nodes depends on the quantization parameters of the cooperation signal. For example, if one spends more bits, i.e. uses an increased quantization depth, to quantize, e.g. an IQ sample, the communicated information gets more accurate, but the amount of communicated data increases, too. The same applies to the quantization of soft bits and is also valid when the signal is compressed before the exchange between nodes.

In the following, some examples of quantized information in cooperation signals will be discussed.

According to one example, IQ samples are quantized. This may be the case both for UL cooperation in which an Rx signal is communicated and in DL cooperation, in which a TX signal is communicated.

Figure 4:
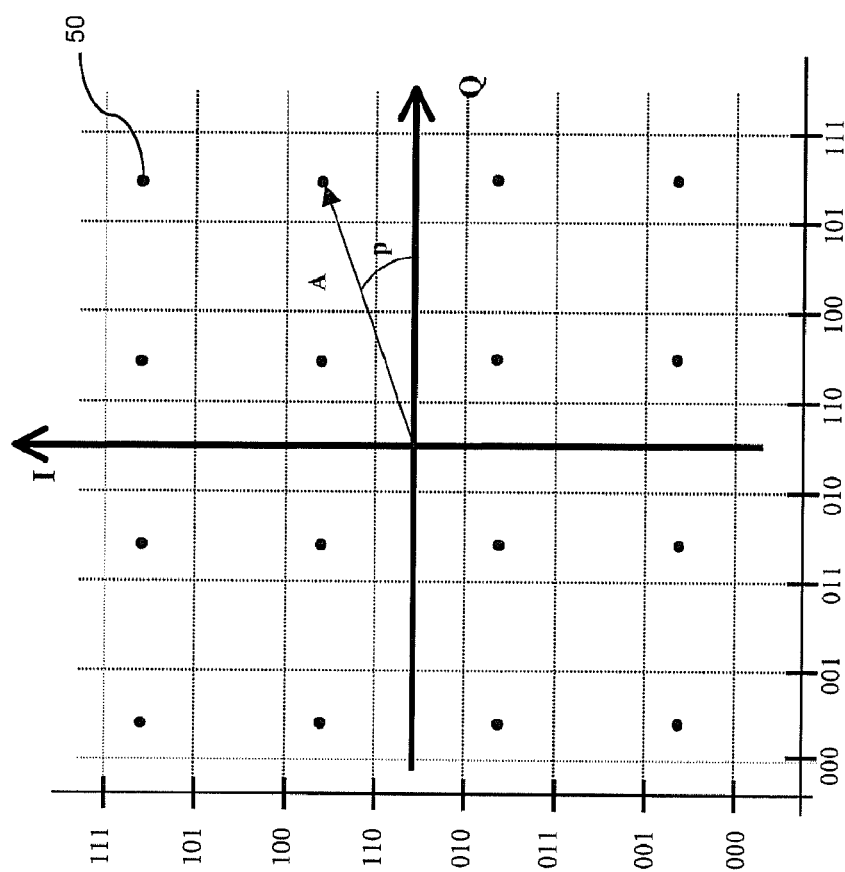
FIG. 4 schematically illustrates an exemplary type of quantization for a Quadrature Amplitude Modulation (QAM) signal constellation.
Figure 5:
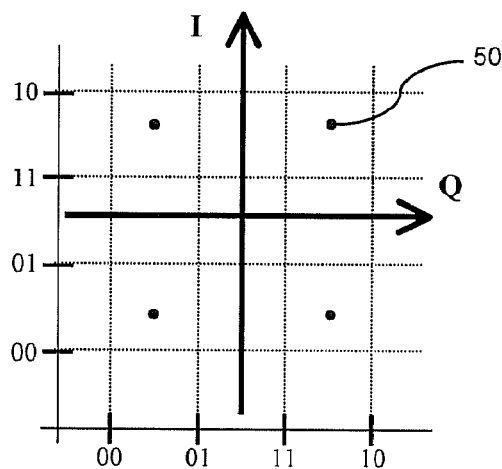
FIG. 5 schematically illustrates an exemplary type of quantization for a Quadrature Phase Shift Keying (QPSK) signal constellation.
Figure 6:
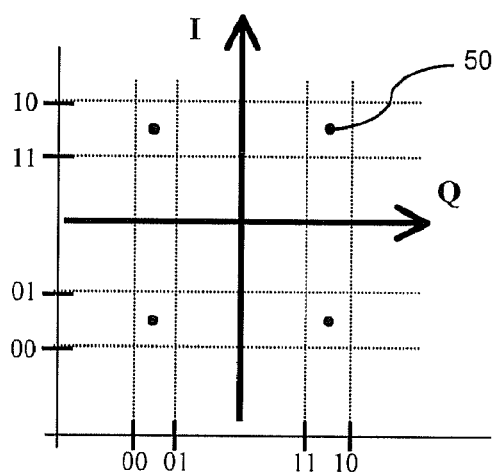
FIG. 6 schematically illustrates a further exemplary type of quantization for a QPSK signal constellation.

FIG. 4 shows an example of a 16QAM constellation diagram, i.e. a QAM constellation diagram with 16 constellation points or modulation order of 16. Each dot 50 represents a valid constellation point used by a transmitter, e.g. one of the transmission units T11, T12, T31 in the devices of FIGS. 2 and 3. FIGS. 5 and 6 each show a constellation diagram for QPSK modulation with four valid constellation points 50 to be used by a transmitter, e.g. one of the transmission units T11, T12, T31 in the devices of FIGS. 2 and 3. In some cases, constellation points may further be multiplied with a complex valued pre-coding vector before transmission.

The constellation points received at a receiver, e.g. one of the receiving units R11, R21 in the devices of FIGS. 2 and 3, are the transmitted values which are typically distorted, e.g. by the influence of a wireless transmission channel.

Accordingly, the received constellation points do not match the transmitted constellation points or ideal points of the constellation.

For digitally communicating the constellation points in the cooperation signal, they are quantized. In the quantization process, a value defining the position of the constellation point is compared to one or more quantization threshold values. As a result of the comparison, a number of digital bits is obtained. The number of digital bits depends on the number of quantization threshold values. In FIGS. 4-6, quantization threshold values are denoted by dotted lines. Vertical dotted lines show quantization threshold values for the Q-axis, and horizontal dotted lines show quantization threshold values for the I-axis. On the left-hand side of the constellation diagrams, bit sequences are illustrated which correspond to the quantization threshold values of the I-axis, and on the bottom side of the constellation diagrams, bit sequences are illustrated which correspond to the quantization threshold values of the Q-axis. It should be noted that the location of constellation points may be represented by IQ samples as shown in FIGS. 4-6, but also by an amplitude A and a phase p, as indicated in FIG. 4, or by any other equivalent representation. The general effect of quantization does not change.

In FIG. 4, the quantization depth is three, i.e. three bits are used to represent a value on the I-axis or a value on the Q-axis. This corresponds to eight different quantization threshold values per axis. In FIGS. 5 and 6, the quantization depth is two, i.e. two bits are used to represent a value on the I-axis or a value on the Q-axis. This corresponds to four different quantization threshold values per axis. In FIGS. 4 and 5 the quantization threshold values are equally spaced. In FIG. 6, an unequal spacing of the quantization threshold values is used. This may allow for an increased accuracy of quantization without increasing the quantization depth.

In order to facilitate differentiating between different constellation points, IQ samples of higher order modulation schemes may be quantized with a larger quantization depth. For example, IQ samples of a 16QAM constellation may be quantized with a larger quantization depth than IQ samples of a QPSK constellation.

According to a further example, soft bits are quantized. This may be applied in the case of UL cooperation.

Figure 7:
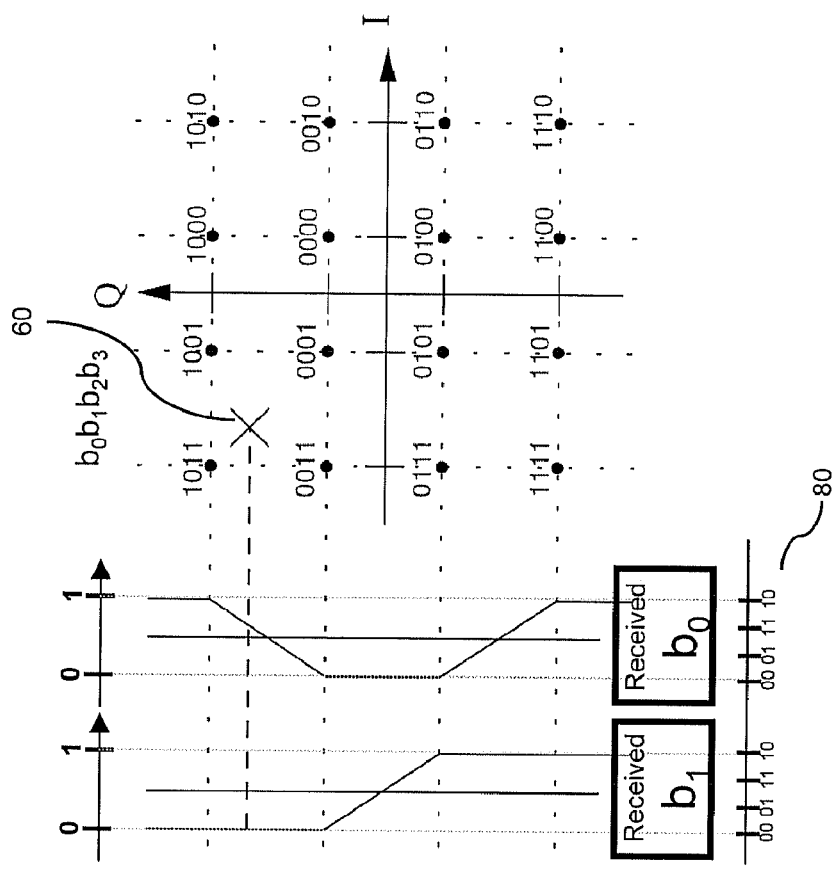
FIG. 7 schematically illustrates an exemplary quantization process with soft bit representation for a QAM signal constellation.

As an example of quantizing soft bits, FIG. 7 shows a 16QAM constellation diagram in which a constellation point corresponds to four bits $b_0$, $b_1$, $b_2$, $b_3$. By way of example. FIG. 7 illustrates soft bit representations of bits $b_0$ and $b_1$. On the left-hand side of FIG. 7, mapping of the bit values bits $b_0$ and $b_1$ to a soft-bit value by means of soft value functions 80 is illustrated. In the situation of FIG. 7, a signal is transmitted using a valid constellation point, but due to disturbances, e.g. the influence of the wireless channel, the receiver receives an Rx signal which does not match a constellation point exactly. In FIG. 7, the location of the Rx signal in the constellation diagram is marked with a cross 60. Soft values of coded bits can now be derived from the Rx signal. Given the Rx signal and the soft value functions FIG. 7, the received bit $b_1$, which is the second bit of the bit sequence associated to a constellation point, is a clear "0". According to the soft value function 80, its representation with a quantization depth of 2 is "00". The received bit $b_0$, which is the first bit of the bit sequence associated to a constellation point, is more likely to be a "1" than a "0". Thus, the corresponding analogue value of the soft bit is 0.6, the quantized value using a quantization depth of 2 is "11". The more quantization bits are allowed to represent the soft value the more accurate is the corresponding information.

Soft values of coded bits may be generated by a demodulator unit as shown above. Soft values of uncoded bits may be generated in a convolutional decoder as part of a turbo decoder unit in the receiver.

It is to be understood that the quantization processes as explained in connection with FIGS. 4-7 are merely exemplary and may be modified or even combined with each other. For example, different quantization parameters may be used for the I-axis and the Q-axis.

Figure 8:
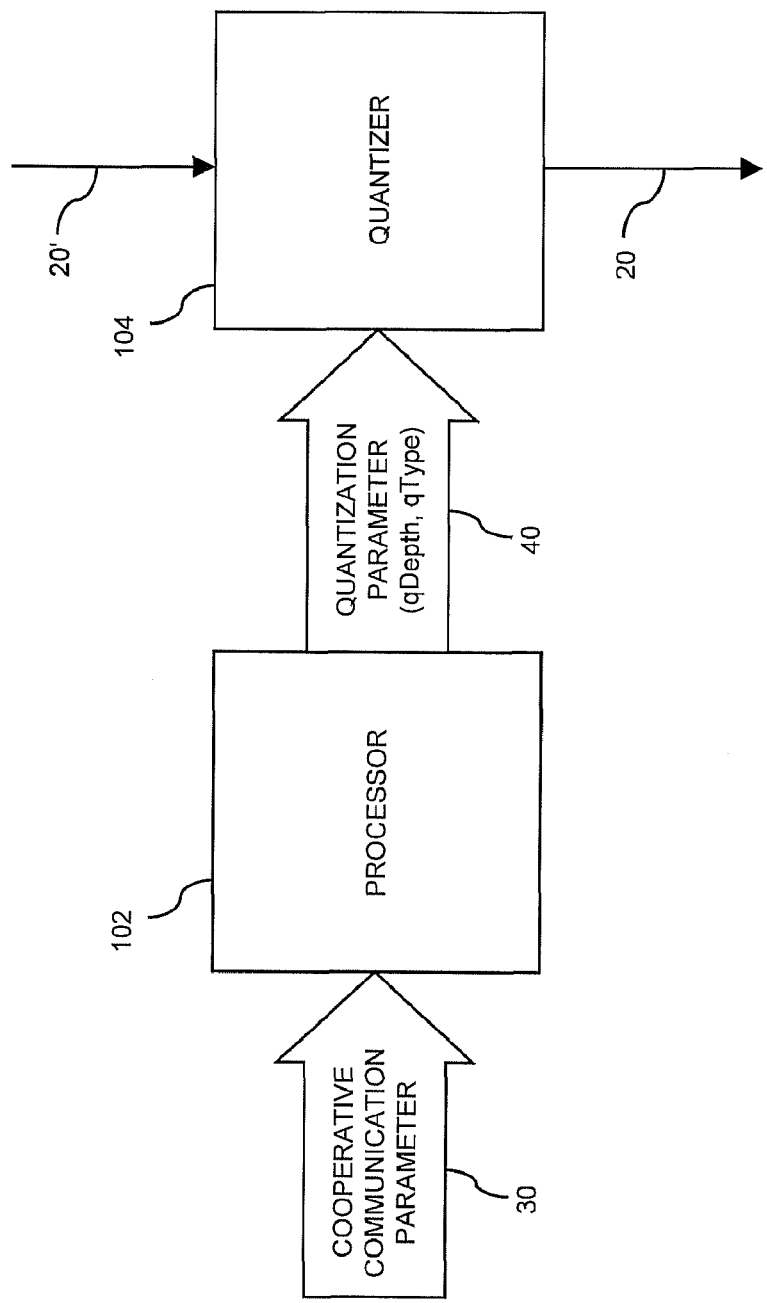
FIG. 8 schematically illustrates components in devices according to embodiments of the invention.

FIG. 8 shows components for implementing a quantization adaptation process according to an embodiment of the invention. The adaptation process may be applied to all above-mentioned examples of quantized information, e.g. IQ samples, time-domain samples, coded soft bits or uncoded soft bits.

Specifically, FIG. 8 shows a processor 102 and a quantizer 104. The processor 102 may be located in any of the devices as shown in FIGS. 1-3. That is to say, the processor 102 may be located in the access node 100-1, 100-1', e.g. may correspond to the processing unit P1, may be located in the access node 100-2, 100-2', e.g. may correspond to the processing unit P2, may be located in the central node 300, e.g. may correspond to the processing unit P4, or may be located in the terminal 200, e.g. may correspond to the processing unit P3. Similarly, the quantizer 104 may be located in any of the devices as shown in FIGS. 1-3. However, it is to be noted that the quantizer 104 is not necessarily located in the same device as the processor 102. In some scenarios, the processor 102 and the quantizer 104 may be located in different devices and communication between the processor 102 and the quantizer 104 occurs via an interface between the different devices, e.g. via an interface between the access node 100-1, 100-1' and the access node 100-2, 100-2', or via an interface between the central node 300 and the serving access node 100-1' or the supporting access node 100-2':

The quantizer 104 may be a dedicated hardware component or may be implemented by software executed by a processor. The quantizer 104 is configured to be adjustable with respect to at least one quantization parameter 40. The quantization parameter may be a quantization depth (qDepth) and/or a quantization type (qType). According to some embodiments, both the quantization depth and the quantization type are adjustable.

The quantizer 104 receives an input signal 20', which may be the cooperation signal to be quantized in analog form or an already quantized version of the cooperation signal. In the latter case, processing in the quantizer 104 will correspond to a re-quantization which may use different quantization parameters than the quantization of the input signal 20'. The output signal of the quantizer 104 is the quantized cooperation signal 20.

As mentioned above, the quantization depth corresponds to the number of bits used to represent a sample or value. The type of quantization refers to the distance measure a quantizer is optimized to. The type of quantization basically determines the location of and the distance between quantization points. Two different examples of quantization types are shown in FIGS. 5 and 6.

The processor 102 is configured to determine a cooperative communication parameter 30. The cooperative communication parameter 30 may be stored in a storage or memory, e.g. in the same device as the processor 102, and the processor 102 retrieves the stored cooperative communication parameter 30. Alternatively or in addition, the cooperative communication parameter 30 may be obtained from another device.

On the basis of the cooperative communication parameter 30, the processor 102 sets the quantization parameter 40 which is supplied to the quantizer 104.

In addition, the quantization parameter 40 may be supplied to other devices, e.g. a device receiving the quantized cooperation signal 20. This may be accomplished via the quantizer 104 or on other signalling paths.

The cooperative communication parameter may be a transmission-specific parameter, such as a type of modulation scheme or a type of coding, or may be a cooperation-specific parameter, such as a path gain difference between different communication paths used in the cooperative signal communication. In the following, more detailed examples of cooperative communication parameters will be explained. Any of these cooperative communication parameters or a combination thereof may be used as a basis for setting the quantization parameter 40.

Examples of transmission-specific parameters are:
a modulation scheme used for transmitting the signal between one or more access nodes and the terminal, e.g. type of modulation such as QAM or QPSK or modulation order,
a coding scheme used for transmitting the signal between the serving access node and the terminal, e.g. a code rate and/or the type of code,
expected or perceived signal quality, e.g. a SINR, in non-cooperative mode,
for UL cooperation, Tx power of the terminal,
for DL cooperation, Tx power of the serving access node,
type or capabilities of receiver and/or transmitter algorithms of the terminal or of the serving access node, e.g. capabilities of interference cancellation or adaptive beamforming.

By way of example, the quantization depth should be higher with 16QAM modulation compared to QPSK modulation. Furthermore, the quantization depth of IQ samples to be transmitted should be higher when the transmitter applies adaptive beamforming compared to non-adaptive transmission.

Examples of cooperation-specific parameters are:
a difference between path gains, e.g. measured as received signal strengths (RSS), of different access nodes, such as a difference between a path gain of the communication path between the serving access node and the terminal and a path gain of the communication path between the supporting access node and the terminal,
a number of cooperating nodes, e.g. a number of cooperating access nodes,
expected or perceived signal quality, e.g. measured as SINR, in cooperative mode, e.g. UL-PTM mode or DL-MTP mode,
data traffic capacity available at the access nodes, e.g. at the serving access node and/or the supporting access node, for communicating the cooperation signal, e.g. a backhaul capacity on a transport network,
data traffic capacity available at a central node, e.g. at the central node 300, for communicating the cooperation signal, e.g. a backhaul capacity on a transport network,
in DL cooperation, Tx power of the supporting access node,
type or capabilities of receiver and/or transmitter algorithms of the supporting access nodes, e.g. capabilities of interference cancellation or adaptive beamforming.

By way of example, the quantization depth should be higher when there is a lot of available data traffic capacity. Furthermore, as compared to simple receiver algorithms such as maximum ratio combining, the quantization depth of received IQ samples should be higher when joint advanced interference cancellation is applied.

Figure 9:
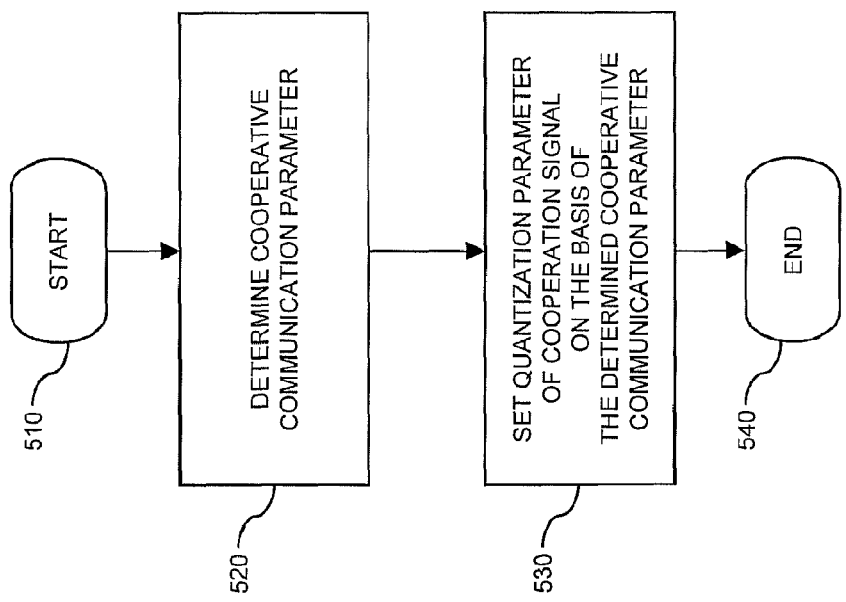
FIG. 9 shows a flowchart for illustrating a method according to an embodiment of the invention.

FIG. 9 shows a flowchart for illustrating a method in accordance with the concepts as explained above.

The method starts at step 510.

At step 520, the cooperative communication parameter is determined. As mentioned above, this may be accomplished on the basis of stored or estimated information.

At step 520, the quantization parameter is set on the basis of the cooperative communication parameter.

Step 520 may be accomplished automatically or may also involve manual interaction of an operator.

According to some embodiments, the quantization depth can be pre-configured at system setup or maintained by Operation and Maintenance (O&M) systems. For instance, a cellular network with a fibre optic transport network for backhauling may be pre-configured with a large quantization depth, while an operator with low-capacity telephone lines as transport links may pre-configure its nodes to use a low quantization depth. Similarly, the quantization parameter could be adapted to other cooperative transmission parameters which do not vary during network operation such as the type of backhaul or the capability of receiver/transmitter algorithms at the cooperating nodes.

According to some embodiments, the quantization depth may be adapted on-demand, e.g. on a medium time scale, which may be accomplished in the above-mentioned way under control of a processor. For instance, for terminals with a small difference in RSS between serving access node and supporting access node, i.e. a small path gain difference, a high quantization depth may be selected. Once the terminal starts to move and the RSS difference increases, the quantization depth may be reduced. Similarly, the quantization parameter could be adapted to long-term effects such as shadowing or traffic load on the backhaul.

The method ends at step 530.

In the following, processes according to embodiments of the invention will be described, which may be used in connection with the devices and components as described above.

Figure 10:
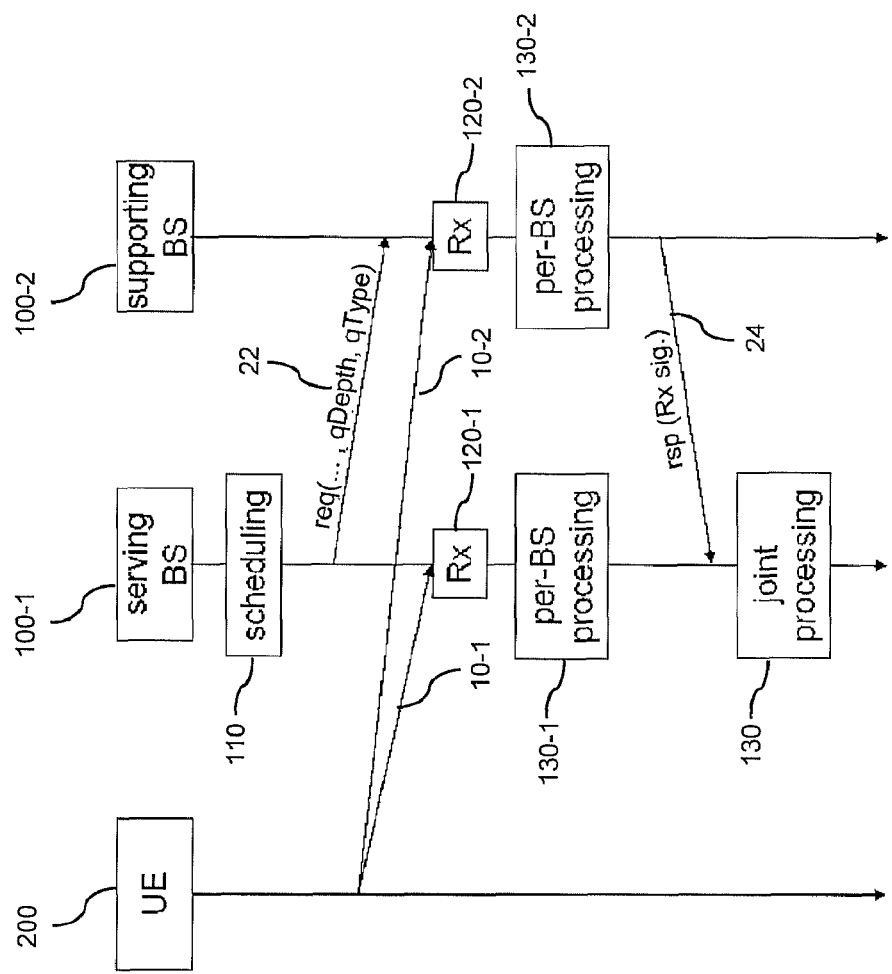
FIG. 10 schematically illustrates a process of UL cooperation according to an embodiment of the invention.

FIG. 10 schematically illustrates an example of a process of UL cooperation between the serving access node 100-1 and the supporting access node 100-2. As mentioned above, the serving access node 100-1 and the supporting access node 100-2 may be different BSs or different sections of the same BS. Again, it is to be understood that more than one supporting access node 100-2 could be provided.

The UE 200 is associated to the serving access node 100-1. The serving access node 100-1 controls the UE 200 and allocates resources for communication. This may be part of a scheduling step 110. The UE 200 has already been identified as a candidate for UL cooperation. Having allocated certain resource blocks (RBs) to the UE 200, the serving access node 100-1 make a request for support from the supporting access node 100-2 with respect to the particular UE 200, by sending a UL cooperation request message (req) 22 to the supporting access node 100-2. The UL cooperation request 22 message can e.g. indicate which type of information relating to the Rx signal 10-2 is required, e.g., IQ samples, demodulated coded data (soft bits) such as LLRs, decoded user data (hard bits), etc. Furthermore, the UL cooperation request message 22 can comprise additional parameters which are required to deliver the requested Rx signal 10-2, e.g., time slots, transmission time intervals (TTIs), and RBs to be received, or parameters for Interference Cancellation (IC) at the supporting access node 100-2.

On the indicated RBs, the supporting access node 100-2 receives the Rx signal 10-2 from the UE 200, as indicated in reception step 120-2. The Rx signal 10-1 from the UE 200 is received at the serving access node 100-1 in reception step 120-1. Depending on the requested type of information relating to the Rx signal, the supporting access node 100-2 might need to process the Rx signal 10-2 as received from the UE 200, as indicated by per-BS processing step 130-2. Typically, the processing on a per access node or per-BS basis in the supporting access node 100-2 will be similar to processing on a per-access node or per-BS basis in the serving access node 100-1, e.g. as performed in a per-BS processing step 130-1. For instance if decoded user data is requested, the supporting access node 100-2 demodulates and decodes the Rx signal 10-2 as received from the UE 200.

After per-access node processing the supporting access node 100-2 responds by sending a response message (rsp) 24 with the requested information, i.e. the Rx signal 10-2 having the type as specified in the request, to the serving access node 100-1. Alternatively, the supporting access node 100-2 may respond by sending information of a type which is related to the requested information. For example, if decoded bits are requested, the supporting access node 100-2 may respond by sending coded bits, e.g. if the supporting access node 100-2 is not able to decode bits from the Rx signal 10-2. Additionally, the supporting access node 100-2 can transmit parameters used by the serving access node 100-2, e.g. parameters used for IC at the serving access node 100-2.

Having received the requested information from the supporting access node 100-2, the serving access node 100-1 can jointly process the Rx signals received by itself and by the supporting access node 100-2. This is accomplished in a joint processing step 130. Depending on the type of the requested Rx signal 10-2, the serving access node 100-1 can, e.g., select the successfully coded bit stream (selection combining), can do soft combining of coded soft bits, or can do interference rejection combining or IC in case of IQ sample exchange. As a result, the serving access node 100-1 determines an improved or optimized signal on the basis of the signals 10-1 and 10-2 received from the terminal 200.

In the above, the cooperation approach is outlined for only one supporting access node 100-2. If the serving access node 100-1 has identified multiple supporting access nodes, the presented approach is individually performed for each supporting access node. That is to say, the serving access node 100-1 requests cooperation from each supporting access node. The UL cooperation request messages 22 can be transmitted as unicast message, as multicast message or, depending on the circumstances, even as broadcast message. Each supporting access node responds with the requested information, i.e. the Rx signal having the type as specified in the request. Further, each supporting access node may cancel or disregard the request. Finally, the joint processing at the serving access node 100-1 combines and processes the Rx signals received at its own antennas and at the supporting nodes.

All parameters or information that are exchanged in the UL cooperation request message 22 or in the response message 24 may be compressed before the actual message exchange and decompressed after the actual message exchange. Here, it is to be noted that compression typically introduces additional time delay, which may be undesirable in some cases.

In the process of FIG. 10, cooperation is requested before the serving access node 100-1 performs processing of its own Rx signal 10-1 on a per-access node basis or per-BS basis, i.e. before the serving access node 100-1 receives the Rx signal 10-1. This approach may be referred to as a proactive approach. In an alternative approach, which may be referred to as a reactive approach, cooperation is requested after per-access node or per-BS processing at the serving access node 100-1, i.e. after the actual reception of the Rx signal 10-1 at the serving access node 100-1. This may be beneficial, e.g., if the serving access node's 100-1 own decoding attempt failed.

The process of cooperation as illustrated in FIG. 10 may be cancelled by both the supporting access node 100-1 and the serving access node 100-2. For instance, in case of successful decoding at the serving access node 100-1 before the response 24 has been received, the serving access node 100-1 could send a cancel message to the supporting access node 100-2.

The request could be disregarded by the supporting access node 100-2 for several reasons. For example, the supporting access node 100-2 could simply ignore the request or it could send an implicit cancel message. The cancel message could contain the reason of cancellation. The supporting access node 100-2 could disregard the request in the case of, e.g. unsuccessful per-access node processing at the supporting access node 100-2 or saturation of backhaul capacity, i.e. a data traffic capacity available for transmitting data from the supporting access node 100-2 to the serving access node 100-1.

By means of the message exchange as described above it is even possible for the serving access node 100-1 to explicitly indicate under which circumstances the request should be disregarded. Several examples of such an indication are possible. According to one example, a signal is received at the supporting access node 100-2 with a higher quality if there are no simultaneous transmissions going on in the supporting access node's 100-2 cell. Thus, a serving access node 100-1 could request cooperation only if there are no simultaneous transmissions on the indicated RBs. This exception may be indicated in the UL cooperation request message 22 or may be pre-configured. According to a further example a priority could indicate how important or valuable the cooperative reception process is. For example, a "gold user" with an expensive subscription may get a higher priority than a best-effort user with a low cost subscription. In the case that the supporting access node 100-2 receives multiple requests which it cannot process, the supporting access node 100-2 may discard the requests with the lowest priorities.

In the process of UL cooperation as illustrated in FIG. 10, the quantization of the cooperation signal takes place at the supporting access node 102-2. Quantized information is then transferred to the serving access node 100-1. The adaptation of the quantization parameter can be accomplished by the serving access node 100-1 and then signalled to the supporting access node 100-2, e.g. in the request message 22. This option may be used when the cooperative communication parameter used for adaptation is available at the serving access node 100-1. The request message 22 may thus comprise the quantization parameter relating to the requested information, e.g. quantization depth (qDepth) or quantization type (qType), as determined by the serving access node 100-1. The adaptation may then take place on a short-time scale, with each new UL cooperation request message 22. This may allow for taking into account short-term effects such as fast fading or instantaneous number of cooperating access nodes.

According to a further option, the supporting access node 100-2 could accomplish the adaptation of the quantization parameter. The quantization parameter could then be indicated to the serving access node 100-1 in the response message 24. The latter option may be useful when the cooperative communication parameter used for adaptation is available at the supporting access node 102-2.

The process as illustrated in FIG. 10 is based on a request-response mechanism, in which the serving access node 100-1 sends a request message 22 and the supporting access node responds 100-2 with a response message 24 including the requested information. In some embodiments, the request-response mechanism may be replaced by a subscribe-publish mechanism. A corresponding process is illustrated in FIG. 11.

Figure 11:
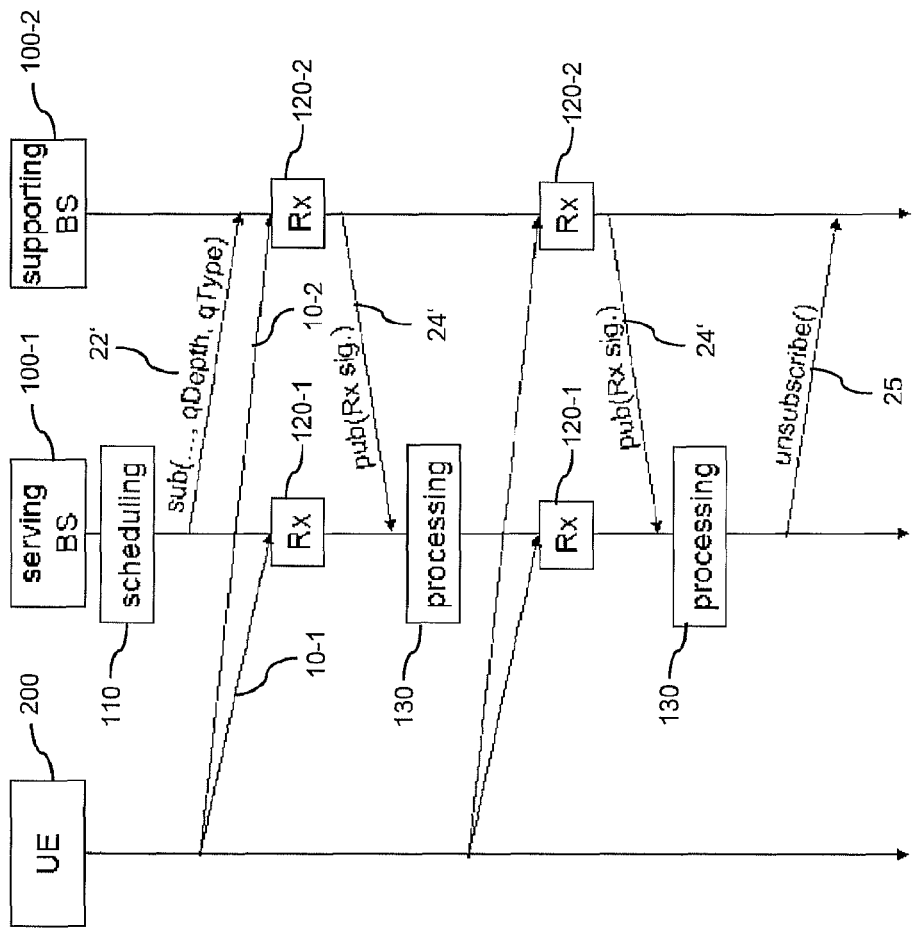
FIG. 11 schematically illustrates a further process of UL cooperation according to an embodiment of the invention.

In the process of FIG. 11, which is based on the subscribe-publish mechanism, an access node 100-2 offers to publish the received Rx signal 10-2 to everyone that has subscribed to that "service". The offer together with capabilities of the access node 100-2, e.g. implemented receiver algorithms, backhaul constraints, number of antennas, etc., may be announced to other access nodes directly or to an O&M system of the communication network. An interested serving access node 100-1 subscribes to the offered service, which may e.g. be "IQ sample transfer", and the offering access node 100-2 then becomes a supporting access node 100-2. For this purpose, the serving access node 100-1 sends a UL cooperation subscribe message (sub) 22' to the supporting access node 100-2, and the supporting access node then sends at least one publish message (pub) 24' including the requested information to the serving access node 100-1. Alternatively, the supporting access node 100-2 may respond by sending information of a type which is related to the requested information. For example, if decoded bits are requested, the supporting access node 100-2 may respond by sending coded bits, e.g. if the supporting access node 100-2 is not able to decode bits from the Rx signal 10-2. The publish message 24' may be sent several times with further, updated information relating to the Rx signal 10-2. Sending of the publish messages 24' may be stopped in response to the serving access node 100-1 sending an unsubscribe message 25 to the supporting access node 100-2. Here it is to be noted that in the process the UL cooperation subscribe message 22' may be regarded as a request for information relating to the Rx signal 10-2.

The UL cooperation subscribe message 22' may contain all relevant information or parameters that are also part of the UL cooperation request message 22 as explained in connection with FIG. 10. In particular, the UL cooperation subscribe message 22' may contain the quantization parameter relating to the requested information, e.g. quantization depth (qDepth) or quantization type (qType). In this case, the adaptation of the quantization parameter may take place on medium-time scale, with each new UL cooperation subscribe message 22'. The publish message 24' may contain the Rx signal 10-2, e.g. in the form of IQ samples, as well as additional parameters that are also part of the response message as explained in connection with FIG. 10. The Rx signal 10-2 in the publish message 24' is quantized according to the quantization parameter received from the serving access node 100-1. If the supporting access node 100-2 accomplishes the adaptation of the quantization parameter, the quantization parameter may be indicated to the serving access node 100-1 in the publish message 24'.

The subscription of the serving access node 100-1 to the service offered by the supporting access node 100-2 may be cancelled when the information relating to the Rx signal 10-2, e.g. IQ samples, of that particular supporting access node 100-2 are no longer needed. For this purpose, the serving access node 100-1 may send the unsubscribe message 25. Other cancelling procedures may be used as an alternative or in addition.

The subscribe-publish mechanism allows for establishing long-term relationships between access nodes with reduced overhead, e.g., for persistent scheduling where RBs are allocated in a sequence of TTIs.

As mentioned above, according to some embodiments the adaptation of the quantization parameter may also be accomplished by the supporting access node 100-2. For example, if the SINR of the Rx signal 10-2 at the receiver of the supporting access node 100-2 is high, the supporting access node 100-2 may transmit soft bits with low quantization depth, because the probability of successful reception is high. If the SINR of the Rx signal 10-2 at the receiver of the supporting access node 100-2 has a low SINR, the supporting access node 100-2 may use a higher quantization depth because the information is more uncertain. In such a scenario, signalling overhead for adapting the quantization parameter is reduced because the involved nodes decide on their own. The used quantization parameters may be signalled along with the cooperation signal.

Figure 12:
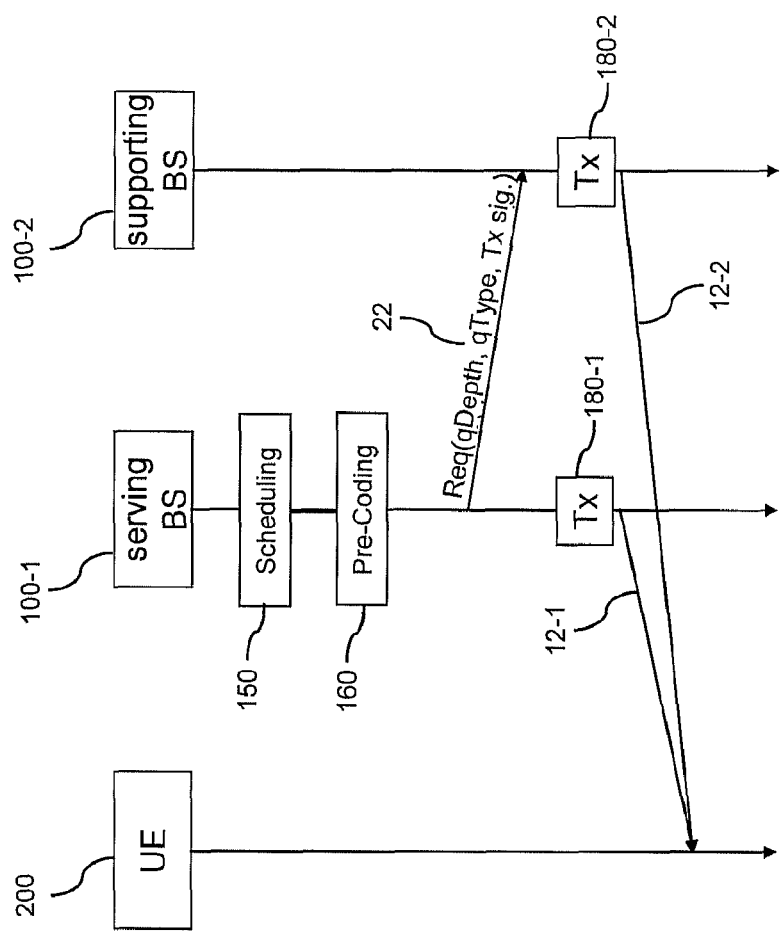
FIG. 12 schematically illustrates process of DL cooperation according to an embodiment of the invention.

FIG. 12 schematically illustrates an example of a process of DL cooperation between a serving access node 100-1 and a supporting access node 100-2. As mentioned above, the serving access node 100-1 and the supporting access node 100-2 may be different BSs or different sections of the same BS. Again, it is to be understood that more than one supporting access node 100-2 could be provided.

The UE 200 is associated to the serving access node 100-1. The serving access node 100-1 controls the UE 200 and allocates resources for communication. This may be part of a scheduling step 150. The UE 200 has already been identified as a candidate for cooperation. Further, the serving access node 100-1 may perform joint processing in the form of pre-coding of the signal to be transmitted to the UE 200, as illustrated by pre-coding step 160. Having allocated certain resource blocks to the UE 200, the serving access node 100-1 make a request for DL support from the supporting access node 100-2 with respect to the particular UE 200, by sending a DL cooperation request message (req) 22 to the supporting access node 100-2. The DL cooperation request message 22 comprises information relating to the Tx signal 12-2 to be transmitted from the supporting access node 100-2, e.g. frequency domain IQ samples or time domain samples of the Tx signal. Furthermore, the DL cooperation request message 22 can comprise parameters further characterizing the desired type of cooperation.

The supporting access node 100-2 receives the DL cooperation request 22 from the serving access node 100-1. The serving access node 100-1 and the supporting access node 100-2 may then cooperatively transmit the Tx signals 12-1 and 12-2 to the UE, as indicated by transmission steps 180-1 and 180-2, respectively.

In the above, the DL cooperation approach is outlined for only one supporting access node 100-2. If the serving access node 100-1 has identified multiple supporting access nodes, the presented approach is individually performed for each supporting access node. That is to say, the serving access node 100-1 requests DL cooperation from each supporting access node. The DL cooperation request messages 22 can be transmitted as unicast message, as multicast message or, depending on the circumstances, even as broadcast message.

In the illustrated process of DL cooperation, quantization of the cooperation signal takes place at the serving access node 100-1. The adaptation of the quantization parameters may be accomplished at the serving access node 100-1 as well. The quantized cooperation signal is then transferred to the supporting access node 100-2 in the DL cooperation request message 22. The used quantization parameters may be signalled along with the cooperation signal. If the cooperative communication parameter used in the adaptation is not available at the serving access node 100-1, it may be obtained from other nodes, e.g. the supporting access node 100-2 or a central node, e.g. the central node 300 of FIG. 3. In the latter case, the cooperative communication parameter may thus be signalled to the serving access node 100-1, before the serving access node 100-1 makes the request to the supporting access node 100-2.

All parameters or information that are exchanged in the DL cooperation request message 22, e.g. the information relating to the Tx signal 12-2, may be compressed before transmission of the DL cooperation request message 22 and decompressed after reception of the DL cooperation request message 22. Here, it is to be noted that compression typically introduces additional time delay, which may be undesirable in some cases.

Also in the case of DL cooperation, it is possible that the adaptation of the quantization parameter takes place outside the serving access node 100-1, e.g. in the supporting access node 100-2 or in a central node, e.g. the central node 300 of FIG. 3. In such a scenario, the adapted quantization parameters could be separately signalled to the serving access node 100-1.

The concepts as described above allow for efficiently adapting the amount of data and information exchanged between cooperating nodes. As a consequence, a flexible tradeoff between data traffic capacity consumption and performance of cooperative signal communication can be obtained.

It is to be understood that the above concepts, examples and embodiments are merely illustrative and are susceptible to various modifications. For example, in the above-described methods and processes, steps or procedures may be executed according to the order as described or in a different order. Further, it is also possible to omit certain steps or procedures without departing from the scope of the present disclosure. Moreover, individual features of different examples or embodiments may be combined with each other as appropriate. In addition, it is to be understood that procedures or functions as described herein may be implemented by dedicated hardware or by software comprising a program code to be executed by a processor.

The invention claimed is:

1. A method of cooperative signal communication for communication between a mobile terminal and a plurality of base stations, comprising:
   determining, by a base station, a cooperative communication parameter for cooperative communication of a signal on at least a first communication path between a first base station and a mobile terminal, and a second communication path between a second base station and the mobile terminal;
   setting, by the base station on the basis of said cooperative communication parameter, a quantization parameter; and
   sending, from the base station, a cooperation signal to at least one of the first base station and the second base station, the cooperation signal carrying information for said cooperative communication of the signal, the information including the quantization parameter;
   wherein the quantization parameter comprises a quantization depth or a quantization type to be used for quantization of the signal.

2. The method of claim 1, wherein the cooperative communication parameter comprises a modulation scheme.

3. The method of claim 1, wherein the cooperative communication parameter comprises a coding scheme.

4. The method of claim 1, wherein the cooperative communication parameter comprises a transmit power.

5. The method of claim 1, wherein the cooperative communication parameter comprises a signal quality on the first communication path, on the second communication path, or both.

6. The method of claim 1, wherein the cooperative communication parameter comprises a receiver algorithm type, a transmitter algorithm type, or both.

7. The method of claim 1, wherein the cooperative communication parameter comprises a difference between a path gain of the first communication path and a path gain of the second communication path.

8. The method of claim 1, wherein the cooperative communication parameter comprises a quantity of cooperating base stations.

9. The method of claim 1, wherein the cooperative communication parameter comprises a data traffic capacity available for transmitting the cooperation signal.

10. The method of claim 1, wherein the cooperation signal comprises digital samples of the signal.

11. The method of claim 1, wherein the cooperation signal is transmitted from the second base station in response to a request from the first base station.

12. A device, comprising:
    memory configured to store instructions for processing; and
    a processing circuit configured, through execution of the stored instructions, to:
      determine a cooperative communication parameter for cooperative communication of a signal on at least a first communication path between a first access node and a mobile terminal, and a second communication path between a second access node and the mobile terminal;
      set, on the basis of said cooperative communication parameter, a quantization parameter; and
      send a cooperation signal to at least one of the first access node and the second access node, the cooperation signal carrying information for said cooperative communication of the signal, the information including the quantization parameter;
    wherein the quantization parameter comprises a quantization depth or a quantization type to be used for quantization of the signal.

13. The device of claim 12, further comprising:
    an interface configured to output the quantization parameter.

14. The device of claim 12, further comprising:
    an interface that the processing circuit is configured to use to send the cooperation signal to at least one of the first access node and the second access node.

15. The device of claim 12, further comprising:
    an interface configured to communicate the signal with the mobile terminal.

16. A communication network, comprising at least a mobile terminal, a first access node, and a second access node, wherein the first access node is connected to a device comprising:
    memory storing instructions for processing; and
    a processing circuit configured, through execution of the stored instructions, to:

determine a cooperative communication parameter for cooperative communication of a signal on at least a first communication path between the first access node and the mobile terminal, and a second communication path between the second access node and the mobile terminal;

set, on the basis of said cooperative communication parameter, a quantization parameter; and send a cooperation signal to at least one of the first access node and the second access node, the cooperation signal carrying information for said cooperative communication of the signal, the information including the quantization parameter;

wherein the quantization parameter comprises a quantization depth or a quantization type to be used for quantization of the signal.

17. A non-transitory computer-readable medium storing a computer program product, said computer program product comprising program instructions for cooperative signal communication, the computer program product comprising computer program code which, when run on a device, configures the device to:

determine a cooperative communication parameter for cooperative communication of a signal on at least a first communication path between a first access node and a mobile terminal, and a second communication path between a second access node and the mobile terminal;

set on the basis of said cooperative communication parameter, a quantization parameter; and send a cooperation signal to at least one of the first access node and the second access node, the cooperation signal carrying information for said cooperative communication of the signal, the information including the quantization parameter;

wherein the quantization parameter comprises a quantization depth or a quantization type to be used for quantization of the signal.

* * * * *